(12) United States Patent
Martin et al.

(10) Patent No.: US 6,852,258 B1
(45) Date of Patent: Feb. 8, 2005

(54) METHOD OF MANUFACTURING A SPONGE DEVICE

(75) Inventors: James C. Martin, Baldwin City, KS (US); Randy S. Kilburn, Lawrence, KS (US); Lowell L. Teague, Lenexa, KS (US); Richard D. Tidd, Lawrence, KS (US)

(73) Assignee: M-Pact Worldwide, L.L.C., Eudora, KS (US)

( * ) Notice: Subject to any disclaimer, the term of this patent is extended or adjusted under 35 U.S.C. 154(b) by 205 days.

(21) Appl. No.: 10/035,912

(22) Filed: Nov. 9, 2001

(51) Int. Cl.[7] .................... B29C 44/06; B29C 44/12
(52) U.S. Cl. .................. 264/46.4; 264/271.1; 264/278; 264/297.1
(58) Field of Search ............... 264/45.1, 46.4, 264/271.1, 278, 297.1; 249/119

(56) References Cited

U.S. PATENT DOCUMENTS

| | | | | | |
|---|---|---|---|---|---|
| 2,138,712 A | * | 11/1938 | Safiert | ................ | 15/244.1 |
| 2,150,196 A | * | 3/1939 | Vaughn | ................ | 300/21 |
| 2,609,347 A | | 9/1952 | Wilson | | |
| 2,810,150 A | * | 10/1957 | Ellman | ................ | 15/244.1 |
| 2,880,443 A | * | 4/1959 | Le Febvre | ............. | 15/244.1 |
| 3,113,672 A | * | 12/1963 | Brown | ................ | 249/121 |
| 3,243,491 A | * | 3/1966 | Bethe | ................ | 264/330 |
| 3,347,237 A | * | 10/1967 | Jones | ................ | 604/369 |
| 3,499,448 A | * | 3/1970 | Jones | ................ | 604/366 |
| 3,512,839 A | * | 5/1970 | Jouffroy | ................ | 300/21 |
| 3,526,918 A | * | 9/1970 | Leland | ................ | 15/121 |
| 4,098,728 A | | 7/1978 | Rosenblatt | | |
| 5,071,331 A | * | 12/1991 | Falco | ................ | 425/4 R |
| 5,170,580 A | | 12/1992 | Rosenblatt | | |
| 5,276,993 A | | 1/1994 | Rosenblatt | | |
| 5,554,658 A | | 9/1996 | Rosenblatt | | |
| 5,554,659 A | | 9/1996 | Rosenblatt | | |

* cited by examiner

*Primary Examiner*—Allan R. Kuhns
(74) *Attorney, Agent, or Firm*—Stinson Morrison Hecker LLP (57) ABSTRACT

A method of making a sponge device is provided. This method includes introducing a curable liquid sponge forming material into a form, placing a handle into the material before it is fully cured, heating the form to cure the material, removing the cured material from the form, and rinsing the cured material. Another aspect of the present invention is the assembly for making this sponge device. This assembly includes a runner for joining a plurality of handles, plates that are spring-biased together to support the handles, a chase formed of heat conductive metal having a shelf where the plates can be set, and a silicone form having a plurality of cavities therein for receiving the sponge forming material.

2 Claims, 8 Drawing Sheets

METHOD OF MANUFACTURING A SPONGE DEVICE

STATEMENT REGARDING FEDERALLY SPONSORED RESEARCH OR DEVELOPMENT

Not Applicable.

CROSS-REFERENCE TO RELATED APPLICATIONS

Not Applicable.

BACKGROUND OF THE INVENTION

The present invention relates to a method of manufacturing a sponge. More particularly, this invention relates to a method of manufacturing a sponge using a casting process. This sponge may be used for medical, cosmetic or general purposes.

Currently, ophthalmic sponges are made by taking a large bun of polyvinyl acetate (PVA) foam or cellulose material and cutting it into the desired thickness. The sponge is washed, dried, compressed, cut and then secured to a handle. The sponge must then be sterilized after it is packaged.

One disadvantage with the present process is that it is very labor intensive, and the multiple cutting and handling steps are expensive. Another disadvantage with the present process is that the multiple cutting steps cause some debris to be left on the sponge, which is referred to in the trade as "float away." No matter how much effort is made to clean up the sponge, some of the debris from the cutting process remains embedded and has the potential to come loose when the sponge is wetted at the time of use. This creates contamination, which, of course, is undesirable in medical applications. Still further, the float away problem is exacerbated by the final step in the conventional manufacturing process. This is a compression step to help shape the sponge. It deeply embeds some of the dust or float away from the cutting operation into the sponge. Another disadvantage is that even if nearly all of the debris is removed from the finished sponge the cutting process leaves an inherently "rough" surface while a smoother surface is preferred.

To overcome the deficiencies found with conventional methods of manufacturing sponges, a new method that does not create float away and results in a smoother finished surface is needed. This method will avoid cutting entirely so as to avoid producing float away particles.

SUMMARY OF THE INVENTION

It is an object of the present invention to provide a method of making a sponge by casting so that no float away is created during manufacturing and which results in the creation of a smoother finished surface than prior art methods.

It is a further object of the present invention to provide an assembly for use in forming these sponges.

According to the present invention, the foregoing and other objects are achieved by a method of manufacturing a sponge device using a casting process. This method includes introducing a curable liquid sponge forming material into a form having cavities therein, placing and precisely holding the handle into the material before it is fully cured, heating the form to cure the material, removing the cured material from the form, and rinsing the cured material. Another aspect of the present invention is the assembly for making this device. This assembly includes a runner for holding a plurality of handles, plates that are spring-biased together to support and locate the handles, a chase formed of heat conductive metal having a shelf where the plates can be set, and a silicone form having a plurality of cavities therein for receiving the curable liquid material.

Additional objects, advantages, and novel features of the invention will be set forth in the description that follows and in part will become apparent to those skilled in the art upon examination of the following, or may be learned by practice of the invention.

DETAILED DESCRIPTION OF THE PREFERRED EMBODIMENT

Figure 1:
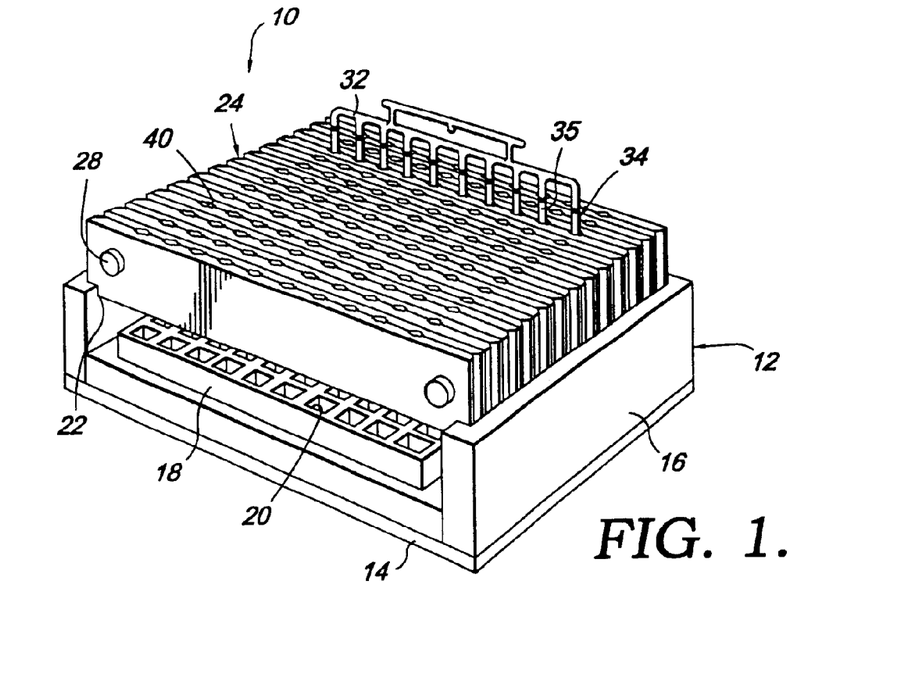
FIG. 1 is a perspective view of the sponge forming assembly of the present invention.
Figure 2:
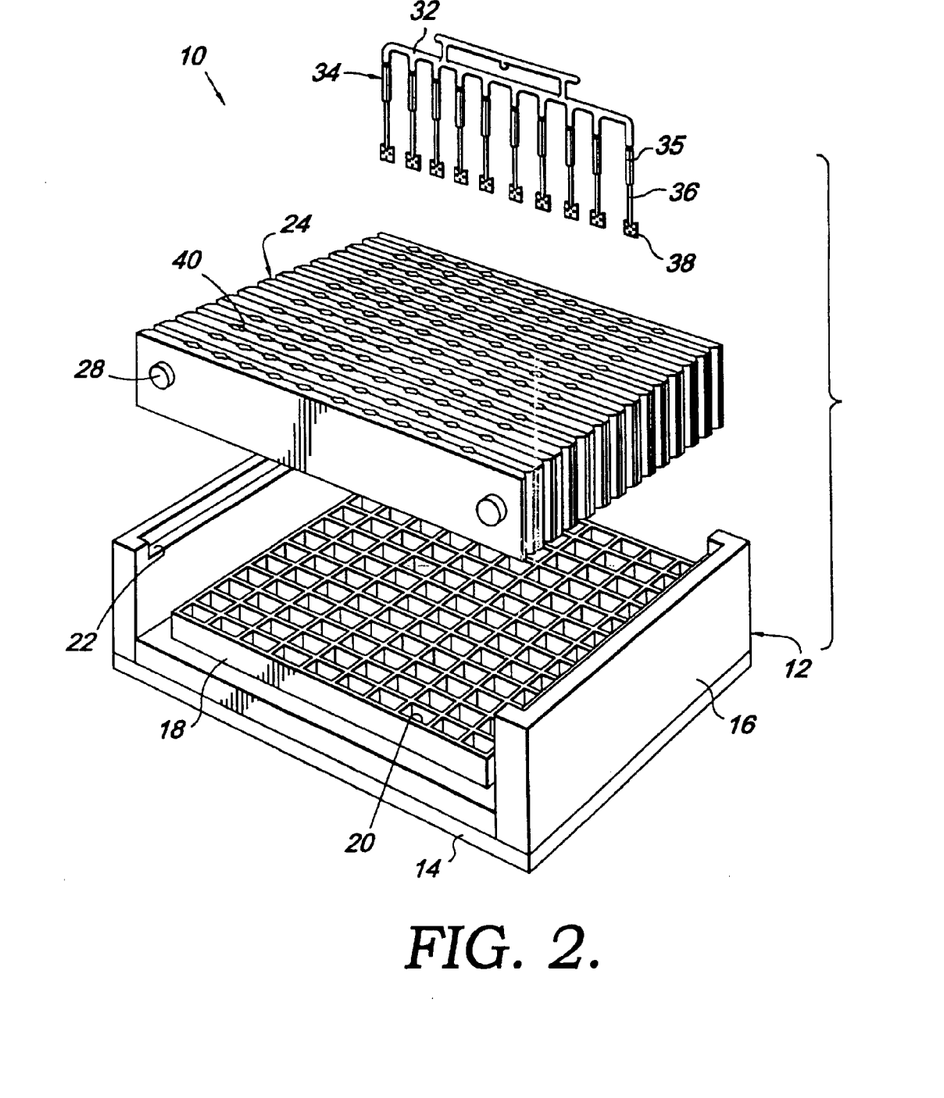
FIG. 2 is an exploded perspective view of the assembly of FIG. 1.
Figure 4:
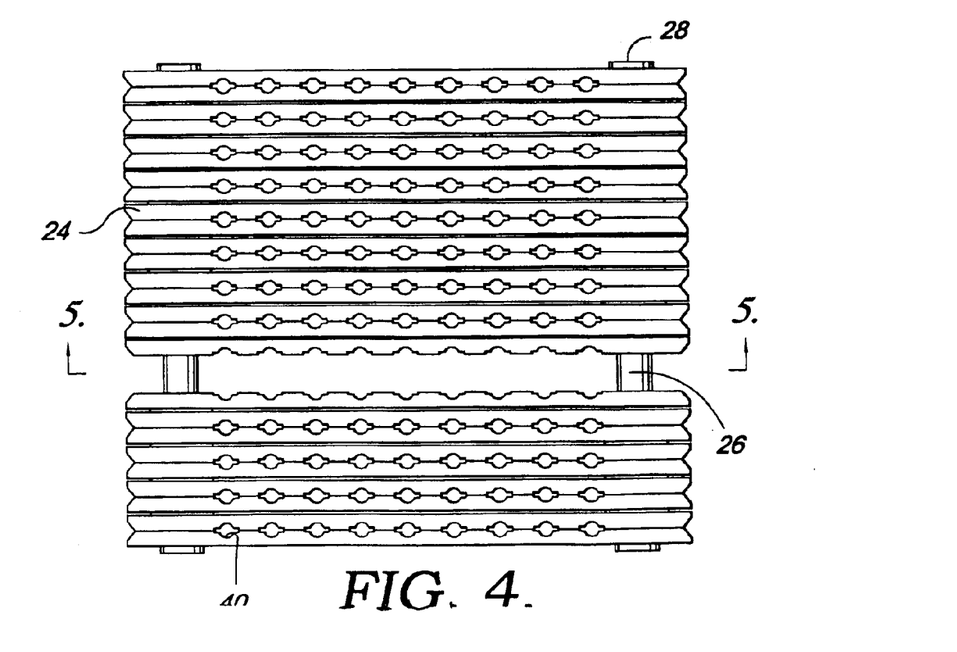
FIG. 4 is a top plan view, similar to FIG. 3, of the form shown in FIG. 1 with complementary plates being separated for removal of sponges.
Figure 5:
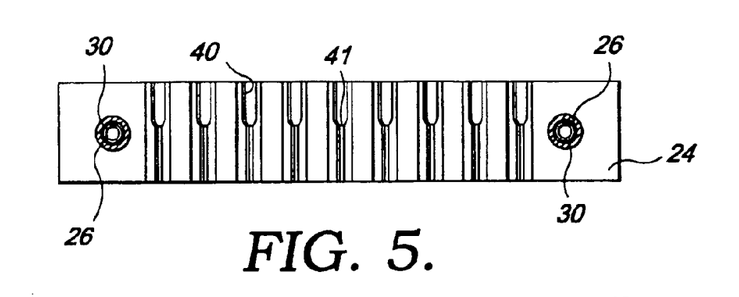
FIG. 5 is a vertical cross-sectional view taken along line 5—5 of FIG. 4.
Figure 7:
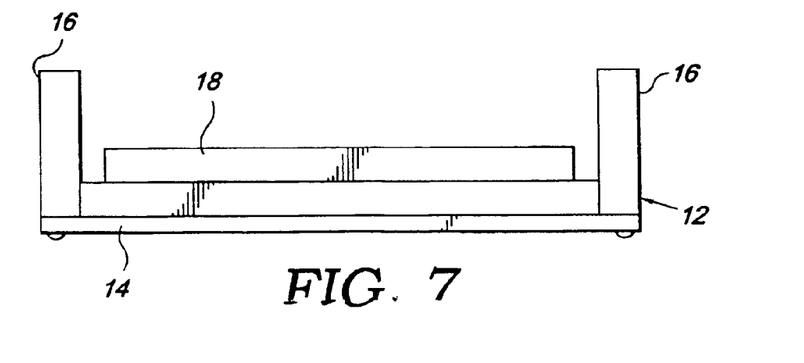
FIG. 7 is a side elevational view of the form and chase shown in FIG. 1.

Referring to FIGS. 1 and 2, an assembly of the present invention is broadly designated by reference numeral 10. Assembly 10 includes a chase 12 having a bottom 14 coupled with sides 16. Assembly 10 also includes a form 18 that rests on bottom 14 of chase 12. Form 18 has cavities 20 therein for forming the sponge devices of the present invention. Chase 12 and form 18 are further shown in FIG. 7. Chase 12 has shelves 22 in its sides 16 for supporting and precisely placing plates 24, which are fastened together with rods 26 or other tubular members and caps 28, as shown in FIGS. 1, 4 and 5. More specifically, plates 24 have openings therein for receiving rods 26, and they are held in substantially planar alignment by the rods. As shown in FIG. 5, a spring 30 is within each rod 26 so that plates 24 can be spring-biased together. Plates 24 can be separated in a direction substantially perpendicular to the parallel planes formed by plates 24 by extending spring 30, which exposes rod 26, as shown in FIG. 4.

Figure 3:
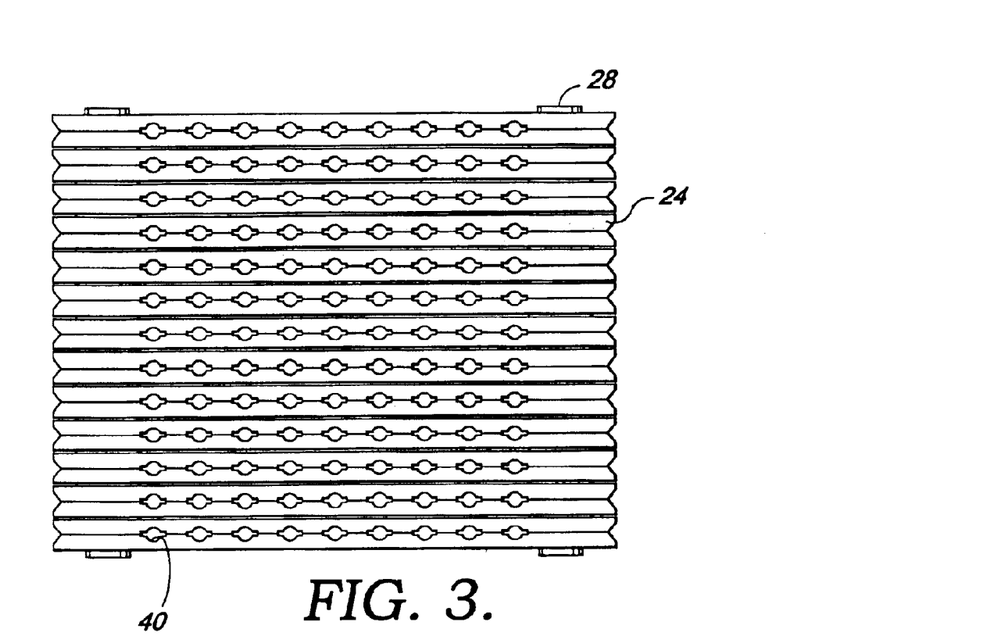
FIG. 3 is a top plan view of the handle carrying rack shown in FIG. 1.
Figure 8:
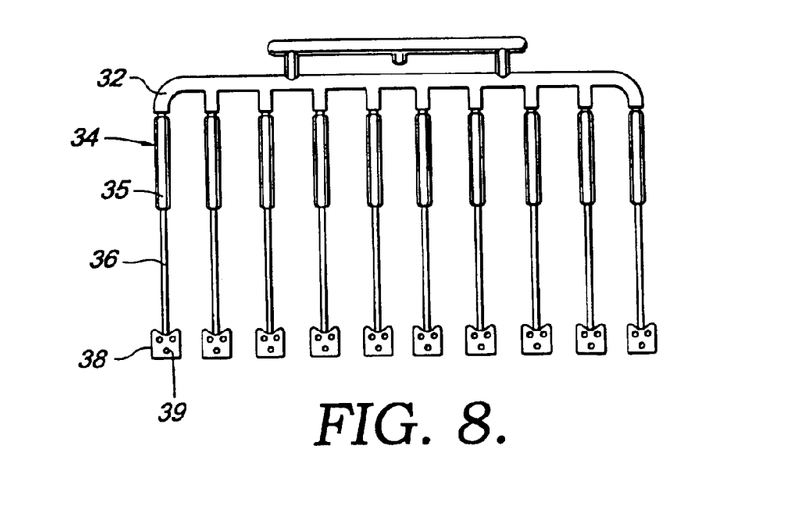
FIG. 8 is a side elevational view of a plurality of handles joined in a common assembly by a runner.

Referring to FIG. 8, a runner 32 joins multiple handles 34 together. Handles 34 include grips 35 attached to stems 36, which are connected to mandrels 38. Mandrels 38 are shown as paddles in FIG. 8 and have holes 39 therein. Alternatively, mandrels 38 could have a grid pattern or be an open skeleton. The plurality of handles 34 joined in common assembly by runner 32 are inserted between plates 24 through holes 40 created by indentations in plates 24, as shown in FIGS. 1, 2 and 3. Holes 40 are further shown in FIG. 5. They have tapered sides that form shelves 41 so as to catch grips 35 of handles 34 when handles 34 are inserted within holes 40.

Figure 6:
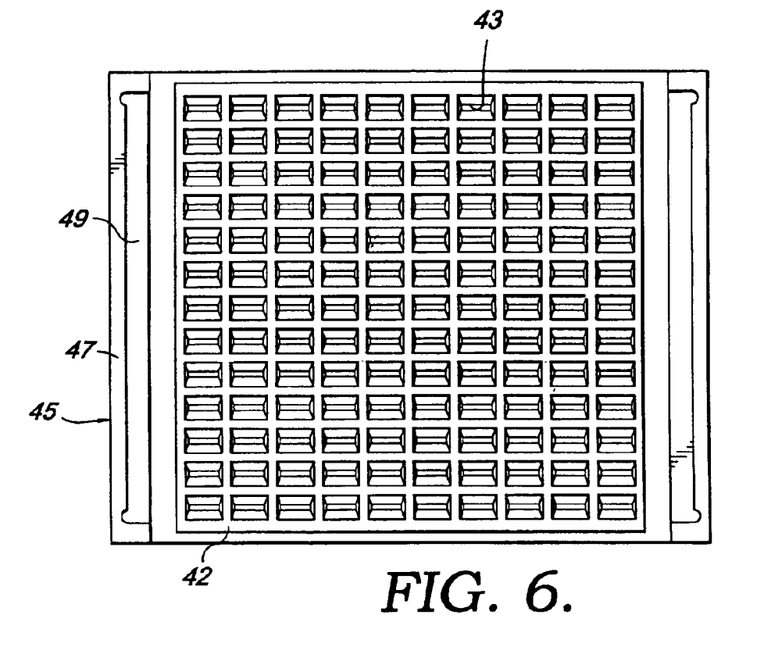
FIG. 6 is a top plan view of the rinse form.

Once the sponge devices of the present invention are formed, they are removed from form 18 and are placed in a rinsing form 42, which is shown in FIG. 6. Rinsing form 42 is identical to form 18 shown in FIG. 1 except it has no bottom so that the sponges may be rinsed. As shown in FIG. 6, it is held by chase 45 having sides 47 and shelves 49 therein. Plates 24 holding runner 32, handles 34, and sponge devices are set on shelves 49 for rinsing.

Figure 13:
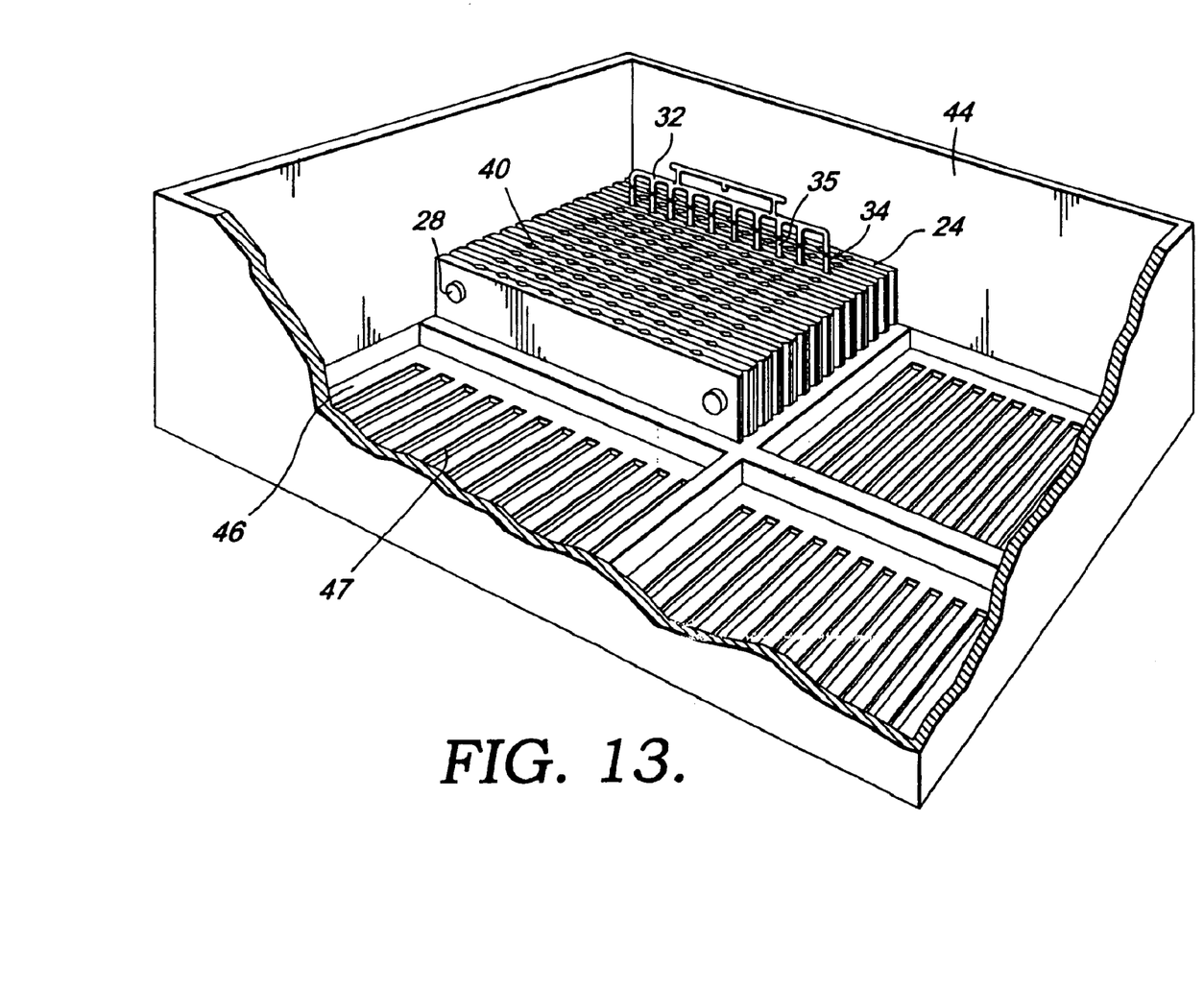
FIG. 13 is a perspective view of the rinsing chamber and washing racks.

Rinsing chamber 44 is shown in FIG. 13. Specifically, rinsing chamber 44 includes four racks 46 with grates 47 therein for holding four different rinsing forms 42 so that many sponges may be rinsed together.

Figures 9, 10, 11, 12:
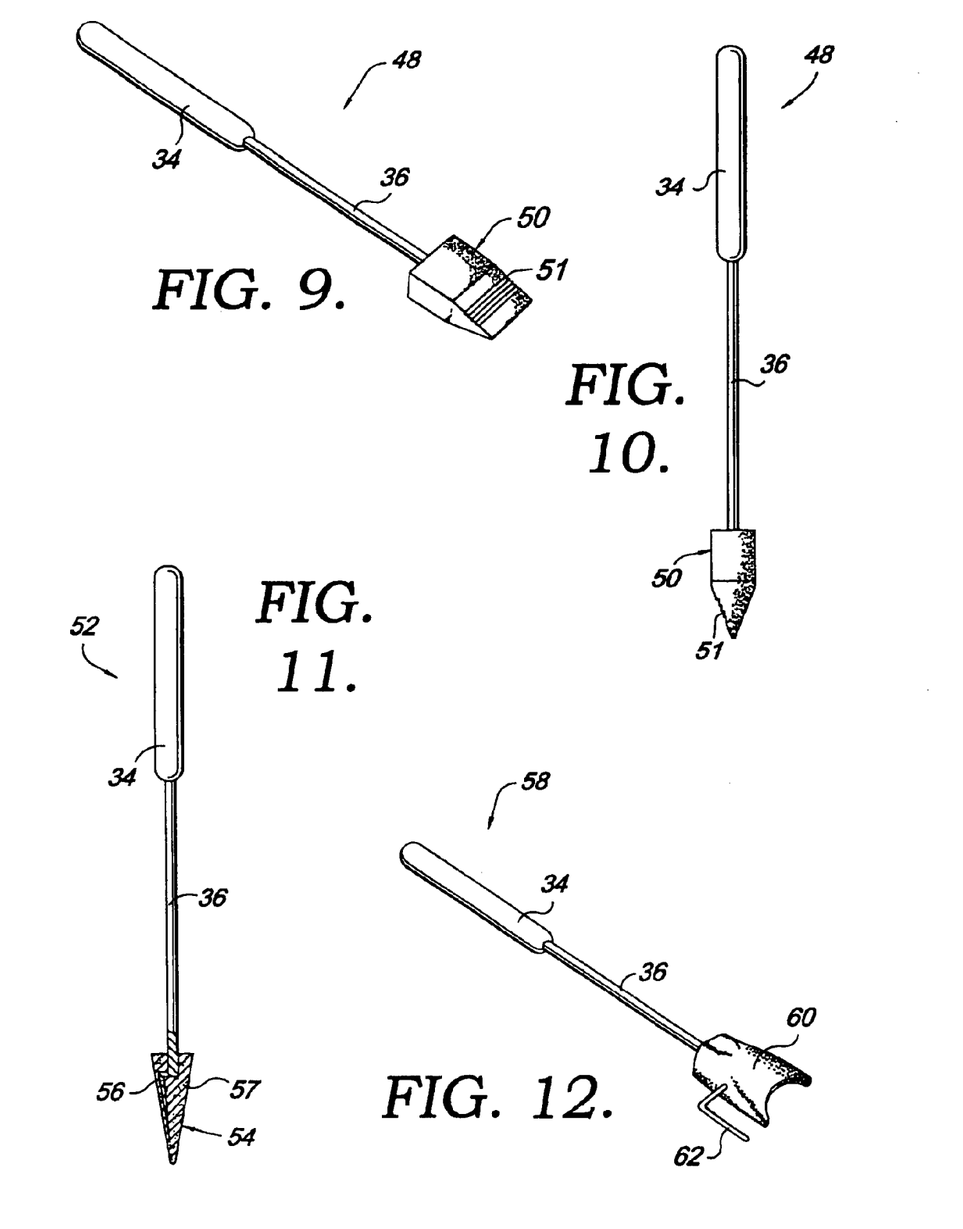
FIG. 9 is a perspective view of sponge device of the present invention.
FIG. 10 is a side elevational view of the sponge device of FIG. 9.
FIG. 11 is a side elevational view of an alternate embodiment of the sponge device of the present invention.
FIG. 12 is a perspective view of an alternate embodiment of the sponge device of the present invention.

One embodiment of the present invention is shown in FIGS. 9 and 10 and is broadly designated by reference numeral 48. This sponge device includes stem 36 coupled with grip 35 and sponge 50 which surrounds mandrel 38. An alternate embodiment of the device of the present invention is shown in FIG. 11 and is broadly designated by reference numeral 52. In sponge device 52, sponge 54 is cast around mandrel 38 such that it surrounds the mandrel but is unequally distributed around the mandrel so that the mandrel is not centered in sponge 54. This forms a harder side 56 and a softer side 57 of sponge 54. Still another alternative embodiment of the present invention is sponge device 58 shown in FIG. 12. This device includes stem 36 coupled with grip 35 and sponge 60. An arm, such as an L-shaped arm 62 as shown in FIG. 12, is attached to mandrel 38. Sponge 60 surrounds mandrel 38, and arm 62 protrudes through sponge 60. Arm 62 may be used to move skin while sponge 60 is used to absorb liquid.

Figure 14:
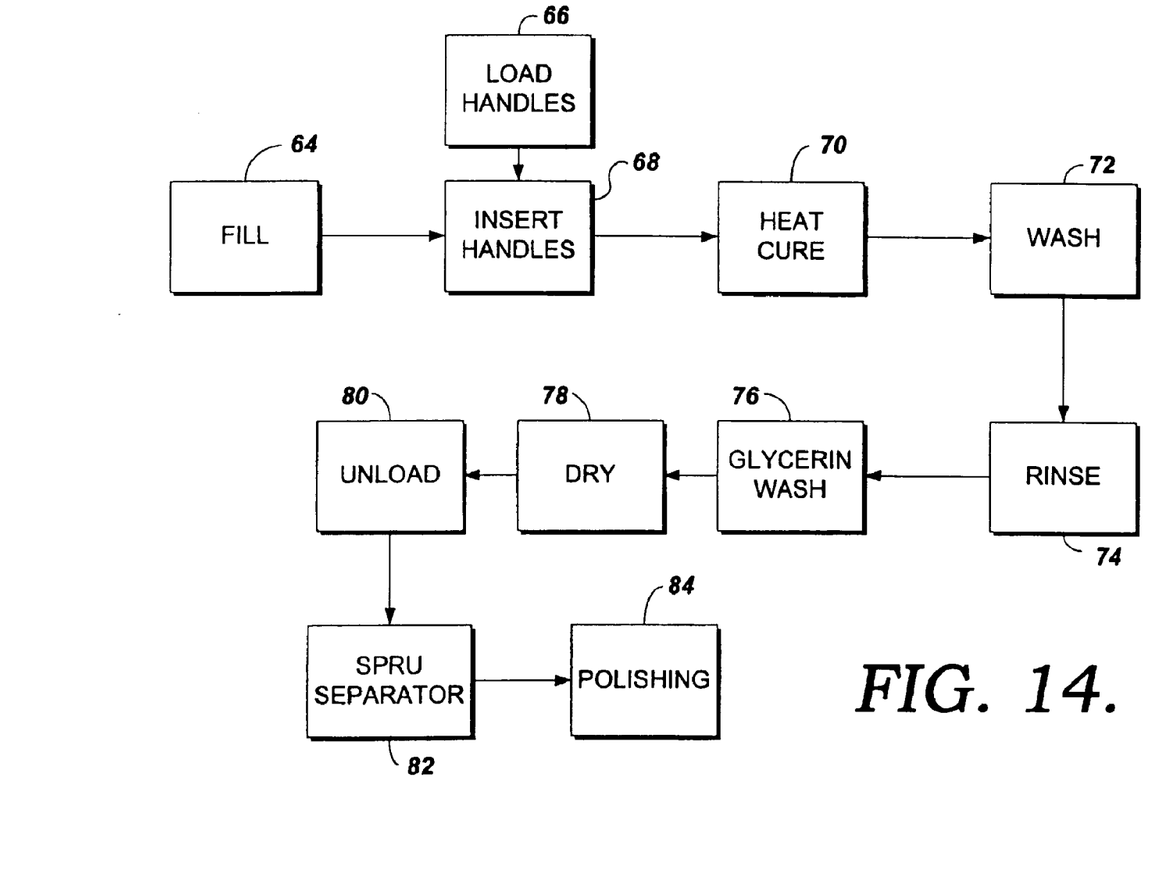
FIG. 14 is a schematic of the process for making the sponge device according to the preferred embodiment of the present invention.

Referring to FIG. 14, a schematic of the process of making sponge device 48, 52 or 58 is shown. First, form 18 is filled with curable liquid sponge forming material at fill station 64. Before the material has dried, handles 34 held by runner 32 are loaded into holes 40 formed by recesses in plates 24 at station 66. Next, runner 32 and handles 34 are lowered so that handles 34 are precisely located into filled form 18 at station 68. This is done by resting plates 24 on shelves 22. Next, the curable liquid material is cured at heat cure station 70. Once cured, the sponge devices formed are washed at station 72 and then rinsed at station 74. Following this, the sponge devices may be put through a glycerin rinse at station 76. The sponge devices are then dried at station 78. Plates 24 are then separated so that runner 32 holding the newly created devices may be unloaded from form 18 and plates 24 at station 80. Handle 34 of each device is then separated from runner 32 at station 82. Following this, the ends of handles 34 are polished at station 84 to remove rough edges from the runner separation process.

More specifically, the process of the present invention includes providing or mixing a curable liquid material, adding a frothing material to the curable liquid material, and filling form 18 with the frothed material. The curable liquid may be, but is not limited to, PVA or cellulose. Preferably, the curable liquid material is PVA. The frothing material can be an inert gas such as compressed air or carbon dioxide. Preferably, compressed air is used.

Preferably, form 18 is filled with PVA using needles that fill form 18 from the bottom up. The needles (not shown) are lowered to the bottom of form 18 to feed PVA into cavities 20 and then the needles are raised as the PVA in the cavities of form 18 rises. This method of filling reduces the amount of undesirable air bubbles that form and reduces air entrapment.

Preferably, chase 12 is made of a heat conductive material so as to transfer heat and bring about the curing of the liquid in form 18. Most preferably, chase 12 is aluminum. Form 18 can be made of silicone, such as a room temperature vulcanizing silicone. Preferably, form 18 is made of silicone because it can be easily cast into the desired shape, resists acidic materials and is easy to clean. For instance, cavities 20 of form 18 may be shaped so as to have one side with an irregular surface so that the resulting cast object has an irregular surface 51 on one side, as shown in FIGS. 9 and 10. Still further, the silicone controls dispersion of the heat by insulating the product contained in the form until it is actually time to heat it. It also prevents temperature variations in the form. Form 18 may be removable and disposable so that the entire unit need not be replaced when the form becomes worn. The surface characteristics of the final product can be controlled by the surface of the form's cavities. For instance, the texture of the surface can be changed to meet the needs of a particular user. Also, logos and other identifying marks can be shaped into the product by varying the shape of cavities 20, and the silicone will tolerate "undercuts" and unusual shapes. It has been found that the combination of an aluminum chase and a silicone form provides superior results because the silicone does not transfer heat rapidly, which allows for the heat to build up over a longer period of time in a more controlled manner. The silicone cavities can have virtually any shape and/or surface characteristics, which will be transferred to the foam in detail.

In order to use a silicone form, about 2 to 3 cycles of material must be run through the for before devices are made. The silicone will extrude certain by-products that may contaminate the final cast sponge if they are not removed with these preliminary cycles.

No liner needs to be used with form 18. However, a throw away liner could be used to help enhance the sterilization process. This liner could be made of water-soluble PVA. It should be able to be easily removed from the form after the sponges are removed.

After cavities 20 are filled, handles 34 joined by runner 32 are inserted into holes 40 created by indentations in plates 24 at station 66. Plates 24 form a handle carrying rack. This assembly allows a plurality of sponge devices to be formed simultaneously by holding the handles in precise and predetermined positions. It also allows a plurality of sponge devices to be simultaneously easily carried from one station to the next as they are being made. The terminal end of the grip 35 sits on an internal shelf 41 formed by the indentations in plates 24, which form holes each of varying diameters. Alternatively, the plates could hold handles 34 by merely using spring tension. Handles 34 are lowered into casting cavities 20 as they are carried by plates 24 that sit on shelves 22.

Next, at station 68, the spring-biased plates 24 are lowered so as to rest on shelves 22 of chase 12 causing parts of handles 34 to be inserted into the curable liquid material before it is cured. This allows the sponge to actually be cast around mandrel 38 of handle 34. Holes 39 in mandrels 38 allow the curable liquid material to go through mandrels 38 so that it is cured around and through the mandrels. With this method, no adhesive is required to secure handle 34 to the sponge. Plates 24 are spring-biased to enable the sponge to be removed from plates 24.

At station 70, heat is applied to form 18 to heat cure the PVA or other liquid curable material. Preferably, curing takes place in a curing oven by convection heating. Preferably, steam lines run around chase 12 and plates 24, and the chase and plates facilitate the transfer of heat to form 18 and the curable liquid material as plates 24 hold handles 34 in place. Preferably, the dry air of the oven is about 130° to 180° F. Most preferably, it is about 170° F. Preferably, heat is applied for approximately one hour.

After heat curing the liquid material to form a cast object such as a sponge, the devices of the present invention, which include a handle surrounded by a cast object, are taken out of form 18 and put into a similar form 42 that has no bottom so that it can be used for rinsing. It is then placed in a rinsing chamber 46. The cast object is washed to remove formaldehyde and sulfuric acid, which are components and/or bi-products of the PVA curing process. In washing station 72, the cast object is washed under high-pressure water/suction for about two minutes then moved to a second station, rinse station 74, where it is washed for about two more minutes. Preferably, the first two wash stations are separated so that the wash water can be recycled and recovered. The first wash station 72 will contain the dirtier water, which will need to be replaced sooner than the rinse water from the second station 74. The water from the second station can therefore be recycled to the first wash station. The cast object is then moved to a third station 76 where it is washed with a softening agent. This step is optional. Preferably, the softening agent is a glycerin, surfactant, and water solution. While about a 5% glycerin solution is preferred, the glycerin content could be about 0 to 10 percent.

The next stage of the process is drying the cast objects at station 78. At the drying stage, the cast objects are taken out of rinsing form 42. Preferably, the drying step occurs in a drying tower at about 110° to 130° F. with about 5–15% humidity while utilizing a vacuum to remove moisture from a the cast object. Most preferably, the temperature is about 120° F. and the humidity is about 10%. Freeze drying is an alternate method of removing excess moisture from the sponge.

The sponges are usually larger in at least one dimension from handles 34. Inmost cases, they are at least about three times larger in one dimension. Therefore, plates 24 must be separated far enough apart to remove the sponge devices. The sponges are unloaded from plates 24, which are substantially parallel to one another, at station 80 by separating the spring-biased plates. After the objects are unloaded, runner 32 is broken away from the sponge devices at station 82. This may be accomplished manually or mechanically. Following this, at station 84, grips 35 are subjected to about 900° F. heat to melt any burrs created from the de-gating of grips 35 from runner 32. This short duration exposure polishes the gate portion of handles 34 but does not damage grip section 35 of the handle.

Optionally, but not preferably, the tip of the cast object or the entire cast object may be compressed once it is removed from form 18. This may improve the appearance and water absorption characteristics at the tip and add uniformity to the overall absorption characteristics of the sponge. It also may increase the wicking rate of the sponge. A compressed tip may create somewhat of a pumping action where the fast wetting tip will tend to transfer absorbed moisture to the slower wetting body of the sponge, which has a greater capacity.

Figure 15:
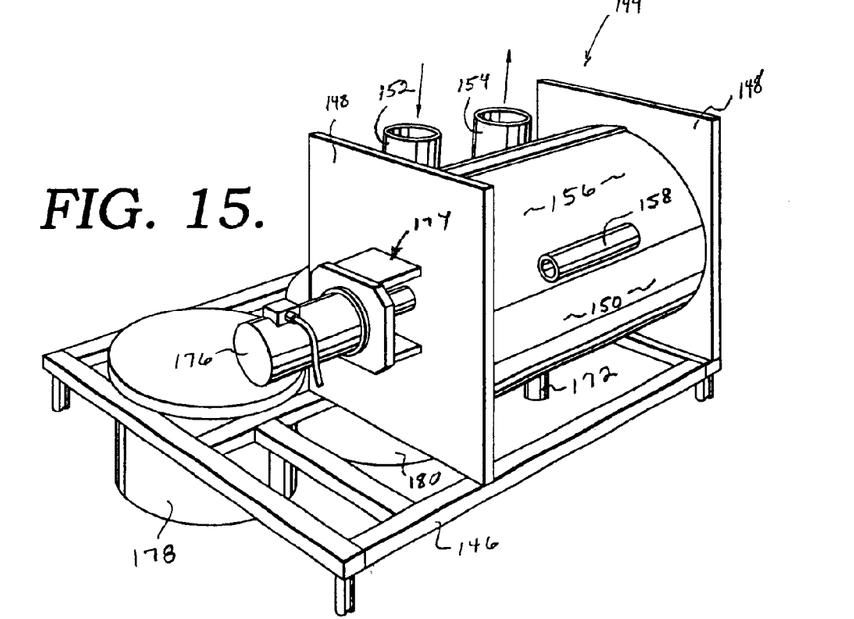
FIG. 15 is a perspective view of an alternative apparatus for performing the washing and rinsing cycles of the process.

FIG. 15 shows an alternative rinsing and processing assembly 144, which has been found to be preferable to chamber 44 previously described. Rinsing assembly 144 comprises a framework 146 on which is mounted vertical planar upright supports 148 which in turn support a stationery drum 150. Drum 150 has an inlet duct 152 and an outlet duct 154 which are in communication with the interior of the drum. Drum 150 also includes a door section 156 with a handle 158, which is moveable from in the closed position shown in FIG. 15 to the open position shown in FIG. 16.

Inside of drum 150 are three rotatable disks 160, 162, and 164. All three disks are keyed to a rotatable shaft 166 and are held in spaced apart relationship by tie rods 168. Each of the disks 160 and 164 has a slot 170 on its inner face and disk 162 has two slots 170 on opposite faces (only one of which is numbered in FIG. 16).

Figure 16:
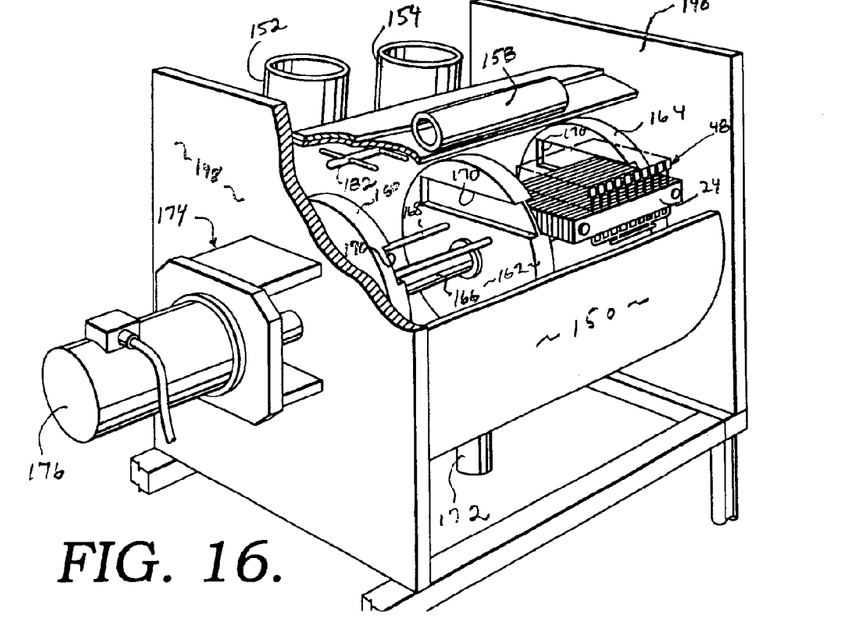
FIG. 16 is another perspective view of the apparatus shown in FIG. 15 with portions cut away for purposes of illustration.

A drain 172 extends from the bottom of drum 150 and communicates with the interior of the drum for removing liquids.

A bracket 174 mounted on one of the end panels 148 supports an electric motor 176 which is the prime mover for shaft 166.

A first storage tank 178 accumulates rinse water for recycling a second storage tank 180 holds a supply of glycerin. An optional spray head 182 mounted near the top of the drum may be used for introducing liquids into the drum.

In operation, the sponge devices 48 of the present invention are casted and heat cured at stations 64 through 70 as previously described. The washing and rinsing steps previously described as occurring at stations 72 through 78 are all designed to take place in the assembly 144. Thus the assembly of plates 24 previously described is inserted into housing 150 by resting the plates in the cavity formed by slots 170 in adjacent disks 160–164. Manifestly, the sponge devices 48 are placed in an upright position as illustrated in FIG. 16. While only a single grouping of sponges 48 is shown in FIG. 16, it is to be understood that normally at least two groupings would be received simultaneously and disks 160–164 may be designed with multiple slots so as to receive a larger number of plates holding devices 48 simultaneously. The drum 150 and rotatable disks 160–164 present a closed cavity centrifuge, which may be rotated at any desired speed by motor 176.

Preferably, the centrifuge is first operated at a relatively high speed in the range of 1,000 to 1,200 rpms for 20 to 45 seconds to remove bi-products of the curing of the PVA foam. Next, a neutralizing base such as potassium hydroxide is introduced by spray head 182. This neutralizing agent is allowed to pool in the bottom of drum 150 and the drum is rotated at a relatively slow speed (i.e., 15 to 25 rpm for 45 to 90 seconds so as to fully saturate the sponge 50 with the neutralizing agent.) The centrifuge is then operated once again at a relatively high speed of 1,000 to 1,200 rpm for 30 to 60 seconds and the liquid is removed via drain 172. The neutralizing process may need to be repeated multiple times to achieve a desired pH of approximately 7.

Next, the devices are rinsed with water, which may be introduced through spray head 182 and allowed to pool in the bottom of the drum. The centrifuge is again operated at relatively low rpm to saturate the sponges and then at relatively high rpms to remove the water. The next step is the glycerin wash as previously described occurring at station 76. The glycerin solution may be introduced into the drum, and the drum is rotated at a relatively low speed of 15 to 25 rpm for 30 to 60 seconds followed by rotation at 450 to 700 rpm for 30 to 60 seconds. It is to be understood that the speed of rotation at this stage as well as the total time of rotation is determined empirically based upon the amount of glycerin that is desired in the final product. Other surfactants may be used in place of or in addition to glycerin.

The drying step previously described as occurring at station 78 may also take place in drum 150. The temperatures and humidity ranges previously stated are applicable. Heated air is, of course, introduced into drum 150 through duct 152 and exits though duct 154. Preferably drying occurs A, by rotating drum 150 first in one direction and then in the opposite direction so that the devices 48 are not deformed as a result of gravitational forces applied in one direction only.

One of the advantages of utilizing rinsing assembly 144 is that it eliminates the need for rinsing form 42. This not only eliminates some equipment costs, but also means that once the sponge devices are withdrawn from form 18 they do not contact any other surface. This reduces the possibility of contamination, which is most important in manufacturing sponges for medical applications. Preferably, all rinse, processing and drying agents are subject to high filtration prior to entering rinse chamber 44 or rinsing and processing assembly 144.

The process of the present invention results in no float away being created. The sponges created by this process do not have the potential for any ambient material or lint fibers to be compressed therein. In addition, the sponges never need to be touched by humans during their manufacturing process. Still further, these cast objects can be made of different densities ranging from a soft, pliable sponge to a much denser material that allows a surgeon to push or "paint" delicate tissues. The mandrel (paddle) can be shaped and positioned within the sponge to impart various characteristics to the sponge. The sponge devices can be fast wicking to control fluids. The sponge can be casted in a contour shape so that it can form to the surgical site, such as the skin or eye so that wiping action is not necessary. It can also be highly absorbent. The sponge devices can be wetted with appropriate medication before use or they can be used dry.

The sponges of the present invention may be used for medical, electronic, cosmetic and other uses. For instance, they may be used in a cosmetic setting for cleaning the skin or applying make, up. They may be used in a medical setting to collect saliva or blood samples. They may also be used in surgery. For example, the sponges may be used in a number of ophthalmic settings including LASIK eye surgery. They may be used in the electronic industry, for example, to clean the surfaces of testing apparatus, silicone wafers, and other components.

From the foregoing, it will be seen that this invention is one well adapted to attain all the ends and objects herein above set forth together with other advantages which are obvious, and inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

We claim:

1. A method of manufacturing a sponge device, comprising:

providing a form having a plurality of cavities therein;

introducing a curable liquid sponge forming material into said cavities of said form;

placing a handle partially into said material in a plurality of said cavities before said material is fully cured;

heating said form and said material therein to cure said material, wherein said material forms a sponge around part of said handle to form a plurality of said devices;

removing said devices from said form;

rinsing said sponge in an aqueous solution;

rinsing said sponge in a solution comprised of glycerin; and providing a runner for joining a plurality of said handles together during all of said steps commencing with said placing step.

2. The method of claim 1, further comprising:

separating said devices from said runner; and polishing said handles of said devices.

\* \* \* \* \*

UNITED STATES PATENT AND TRADEMARK OFFICE
CERTIFICATE OF CORRECTION

PATENT NO. : 6,852,258 B1
DATED : February 8, 2005
INVENTOR(S) : James C. Martin et al.

It is certified that error appears in the above-identified patent and that said Letters Patent is hereby corrected as shown below:

Column 4,
Line 45, delete "for" and insert -- form -- therefor.

Column 5,
Line 53, delete "Inmost" and insert -- In most -- therefor.

Column 7,
Line 19, delete "A,".

Signed and Sealed this

Twenty-fourth Day of May, 2005

JON W. DUDAS
*Director of the United States Patent and Trademark Office*